United States Patent
Li et al.

(10) Patent No.: US 11,795,897 B2
(45) Date of Patent: Oct. 24, 2023

(54) METHOD AND DEVICE FOR START-STOP CONTROLLING OF VEHICLE, VEHICLE AND ELECTRONIC APPARATUS

(71) Applicant: GREAT WALL MOTOR COMPANY LIMITED, Hebei (CN)

(72) Inventors: Yunfei Li, Baoding (CN); Qilin Chen, Baoding (CN)

(73) Assignee: GREAT WALL MOTOR COMPANY LIMITED, Bebei (CN)

( * ) Notice: Subject to any disclaimer, the term of this patent is extended or adjusted under 35 U.S.C. 154(b) by 20 days.

(21) Appl. No.: 17/765,582

(22) PCT Filed: Nov. 4, 2020

(86) PCT No.: PCT/CN2020/126431
§ 371 (c)(1),
(2) Date: Jul. 20, 2022

(87) PCT Pub. No.: WO2021/103966
PCT Pub. Date: Jun. 3, 2021

(65) Prior Publication Data
US 2022/0397087 A1    Dec. 15, 2022

(30) Foreign Application Priority Data
Nov. 26, 2019  (CN) .......................... 201911175411.3

(51) Int. Cl.
*B60W 10/06*        (2006.01)
*F02N 11/08*        (2006.01)

(52) U.S. Cl.
CPC ................................ *F02N 11/0829* (2013.01)

(58) Field of Classification Search
CPC ............. F02N 11/0818; F02N 11/0829; F02N 11/0837; F02N 2200/125; F02D 29/02; B60W 10/06; B60W 40/00; B60W 40/105
See application file for complete search history.

(56) References Cited

U.S. PATENT DOCUMENTS 9,677,529 B2 *   6/2017   Ohsaki ................ B60L 15/2009
11,279,357 B2 *   3/2022   Ohsaki ................ B60R 16/0236
(Continued)

FOREIGN PATENT DOCUMENTS

CN       101850767 A    10/2010
CN       102490719 A     6/2012
(Continued)

OTHER PUBLICATIONS

International Application No. PCT/CN2020/126431 International Search Report and Written Opinion with English Machine Translation dated Jan. 27, 2021, 9 pgs.

*Primary Examiner* — Phutthiwat Wongwian
*Assistant Examiner* — Arnold Castro
(74) *Attorney, Agent, or Firm* — Fredrikson & Byron, P.A.

(57) ABSTRACT

The present application disclosed a a method and a device for controlling start-stop of a vehicle, a vehicle and an electronic apparatus. The method includes steps of: acquiring a first start-stop instruction, and determining a first start-stop type of the vehicle according to the first start-stop instruction; acquiring a second start-stop instruction, and determining a second start-stop type of the vehicle according to the second start-stop instruction; and performing start-stop controlling on an engine according to priorities of the first start-stop type and the second start-stop type. Therefore, the method can actively control the start-stop of the engine according to the priority of the start-stop type, which can well respond to the driving intention of the driver, the driving experience is improved, the start-stop time of the engine is saved, and the fuel consumption of the vehicle is greatly reduced, and the driving safety of the vehicle and the personal safety of the driver and passengers are guaranteed.

17 Claims, 3 Drawing Sheets

(56) References Cited

U.S. PATENT DOCUMENTS

| | | | | |
|---|---|---|---|---|
| 2015/0088405 A1* | 3/2015 | Iijima | ............... | F02D 29/02 701/112 |
| 2015/0166074 A1* | 6/2015 | Inomata | ............... | B60W 40/10 701/1 |
| 2016/0201633 A1* | 7/2016 | Quinteros | ............ | F02N 11/084 477/107 |
| 2018/0245560 A1* | 8/2018 | Pochner | ............. | F02N 11/0837 |
| 2019/0072064 A1* | 3/2019 | Books | ................ | F02N 11/0829 |
| 2019/0135285 A1* | 5/2019 | Goh | .......................... | B60T 8/32 |

FOREIGN PATENT DOCUMENTS

| | | |
|---|---|---|
| CN | 104937245 A | 9/2015 |
| CN | 105636845 A | 6/2016 |
| CN | 106285972 A | 1/2017 |
| CN | 108590912 A | 9/2018 |
| JP | 2018131069 A | 8/2018 |

\* cited by examiner

METHOD AND DEVICE FOR START-STOP CONTROLLING OF VEHICLE, VEHICLE AND ELECTRONIC APPARATUS

CROSS REFERENCE TO RELATED APPLICATION

The present application is a National phase of international patent application No. PCT/CN2020/126431 with an international filling date of Nov. 4, 2020, designating the USA, now pending, and further claims priority of Chinese Patent Application No. 201911175411.3, with filling date of Nov. 26, 2019, the contents of all of the aforementioned application, including any intervening amendments thereto, are incorporated herein by reference.

TECHNICAL FIELD

The present application relates to the field of start-stop technology, and more particularly to a method and a device for controlling start-stop of a vehicle, a vehicle and an electronic apparatus.

BACKGROUND

In the prior art, after the engine of the vehicle receives the stop instruction, if the driver wants to start the engine again, the engine will still complete the stop according to the stop instruction, and then start again. The required start-stop time is long, which affects the driving experience of the driver, and first stop and then start, will also bring greater fuel consumption.

In addition, after the engine of the vehicle receives the start instruction, if the vehicle collides or the parts are abnormal at this time, for the safety of the vehicle and the personal safety of the drivers and passengers, the engine needs to be kept stopped and prohibited from starting. However, in the prior art, the engine will still complete the start according to the start instruction, which is not conducive to the driving safety of the vehicle, and even endangers the personal safety of the drivers and passengers.

SUMMARY

The present application aims to solve one of the technical problems in the above technologies at least to a certain extent. Therefore, an object of the present application is to provide a method for controlling start-stop of a vehicle, which can actively control the start-stop of the engine according to the priority of the start-stop type, and can respond well to the driving intention of the driver or the actual condition of the vehicle, which improves the driving experience, further saves the start-stop time of the engine, greatly reduces the fuel consumption of the vehicle, and ensures the driving safety of the vehicle and the personal safety of the drivers and passengers.

A second object of the present application is to provide a vehicle providing a device for controlling start-stop of the vehicle.

A third object of the present application is to provide an electronic apparatus.

A fourth object of the present application is to provide a computer-readable storage medium.

In order to achieve above objects, a first aspect of the present application provides a method for controlling start-stop of a vehicle, which includes steps as following: acquiring, through a processer, a first start-stop instruction, and determining, through a vehicle controller, a first start-stop type of the vehicle according to the first start-stop instruction; acquiring, through a processer, a second start-stop instruction, and determining, through a vehicle controller, a second start-stop type of the vehicle according to the second start-stop instruction; and performing, through a control circuit, start-stop controlling on an engine according to priorities of the first start-stop type and the second start-stop type.

According to the method for controlling start-stop of a vehicle according to the embodiment of the present application, acquiring a first start-stop instruction, and determining a first start-stop type of the vehicle according to the first start-stop instruction; acquiring a second start-stop instruction, and determining a second start-stop type of the vehicle according to the second start-stop instruction; and finally, performing start-stop controlling on an engine according to priorities of the first start-stop type and the second start-stop type. Therefore, the controlling method can actively control the start-stop of the engine according to the priority of the start-stop type, which can well respond to the driving intention of the driver, the driving experience is improved, the start-stop time of the engine is saved, and the fuel consumption of the vehicle is greatly reduced, and the driving safety of the vehicle and the personal safety of the driver and passengers are guaranteed.

In addition, the method for controlling start-stop of a vehicle according to the above embodiments of the present application may also have the following additional technical features:

In an embodiment of the present application, the step of performing start-stop controlling on an engine according to priorities of the first start-stop type and the second start-stop type includes: acquiring a start-stop type with a higher priority among the first start-stop type and the second start-stop type as a target start-stop type, and performing start-stop controlling on the engine according to the target start-stop type.

In an embodiment of the present application, the method for controlling start-stop of a vehicle further includes: acquiring a start-stop process matching the target start-stop type selected and executed by the vehicle; wherein the start-stop process comprises a start-stop torque control gradient and a target rotational speed that are required in the start-stop process; and the target start-stop type is the first start-stop type or the second start-stop type; and performing start-stop controlling on the engine according to the start-stop process.

In an embodiment of the present application, the method for controlling start-stop of a vehicle further includes: when the target start-stop type selected to be executed by the vehicle is a start type, the start-stop torque control gradient is a torque rise gradient; and when the target start-stop type selected to be executed by the vehicle is a stop type, the start-stop torque control gradient is a torque decrease gradient.

In an embodiment of the present application, the step of performing start-stop controlling on the engine according to the target start-stop type further includes: acquiring a rotational speed of the engine and when identifying that the rotation speed is greater than a set speed then performing start-stop controlling on the engine according to a set start-stop type when the first start-stop type is a normal stop, and the second start-stop type is the set start-stop type with a higher priority than the normal stop; wherein the set start-stop type is the target start-stop type.

In an embodiment of the present application, the method for controlling start-stop of a vehicle further includes: when identifying that the priority of the first start-stop type is the same as the priority of the second start-stop type, then acquiring a triggering moment of the first start-stop instruction corresponding to the first start-stop type and a triggering moment of the second start-stop instruction corresponding to the second start-stop type, and selecting the start-stop type with earlier triggering moment as the target start-stop type.

In an embodiment of the present application, the method for controlling start-stop of a vehicle further includes: monitoring real-time working condition of the vehicle, and generating start-stop instructions according to the real-time working condition.

In order to achieve above objects, in a second aspect of the present application provides a vehicle, which includes a device for controlling start-stop of the vehicle, and the device includes: an acquisition processer disposed in a vehicle console and a control circuit of a start-stop controller of an engine in the vehicle: the acquisition processer is configured for acquiring a first start-stop instruction and a second start-stop instruction; and the control circuit is configured for determining a first start-stop type of the vehicle according to the first start-stop instruction, determining a second start-stop type of the vehicle according to the second start-stop instruction, and performing start-stop controlling on an engine according to priorities of the first start-stop type and the second start-stop type.

In the device for controlling start-stop of a vehicle according to an embodiment of the present application, the first start-stop instruction and the second start-stop instruction are firstly acquired, and then determining the first start-stop type and the second start-stop type of the vehicle respectively according to the first start-stop instruction and the second start-stop instruction, and finally, performing start-stop controlling on an engine according to priorities of the first start-stop type and the second start-stop type. Therefore, the controlling device can actively control the start-stop of the engine according to the priority of the start-stop type, which can well respond to the driving intention of the driver, the driving experience is improved, the start-stop time of the engine is saved, and the fuel consumption of the vehicle is greatly reduced, and the driving safety of the vehicle and the personal safety of the driver and passengers are guaranteed.

In addition, the device for controlling start-stop of a vehicle according to the above embodiments of the present application may also have the following additional technical features:

In an embodiment of the present application, the control module is further configured for: acquiring a start-stop type with a higher priority among the first start-stop type and the second start-stop type as a target start-stop type, and performing start-stop controlling on the engine according to the target start-stop type.

In an embodiment of the present application, the control module is further configured for: acquiring a start-stop process matching the target start-stop type selected and executed by the vehicle; wherein the start-stop process comprises a start-stop torque control gradient and a target rotational speed that are required in the start-stop process; and the target start-stop type is the first start-stop type or the second start-stop type; and performing start-stop controlling on the engine according to the start-stop process.

In an embodiment of the present application, the control module is further configured for: wherein when the target start-stop type selected to be executed by the vehicle is a start type, the start-stop torque control gradient is a torque rise gradient; and when the target start-stop type selected to be executed by the vehicle is a stop type, the start-stop torque control gradient is a torque decrease gradient.

In an embodiment of the present application, the control module is further configured for: acquiring a rotational speed of the engine and when identifying that the rotation speed is greater than a set speed then performing start-stop controlling on the engine according to a set start-stop type when the first start-stop type is a normal stop, and the second start-stop type is the set start-stop type with a higher priority than the normal stop; wherein the set start-stop type is the target start-stop type.

In an embodiment of the present application, the control module is further configured for: when identifying that the priority of the first start-stop type is the same as the priority of the second start-stop type, then acquiring a triggering moment of the first start-stop instruction corresponding to the first start-stop type and a triggering moment of the second start-stop instruction corresponding to the second start-stop type, and selecting the start-stop type with earlier triggering moment as the target start-stop type.

In the vehicle according to embodiments of the present application, by the device for controlling tart-stop of the vehicle, which can actively control the start-stop of the engine according to the priority of the start-stop type, which can well respond to the driving intention of the driver, the driving experience is improved, the start-stop time of the engine is saved, and the fuel consumption of the vehicle is greatly reduced, and the driving safety of the vehicle and the personal safety of the driver and passengers are guaranteed.

In order to achieve above objects, in a third aspect of the present application provides an electronic apparatus, which includes a memory and a processor; wherein the processor executes a program corresponding to the executable program code by reading the executable program code stored in the memory, to implement the method for start-stop controlling of a vehicle in embodiments of the first aspect.

In the electronic apparatus according to embodiments of the present application, by the processor executing a computer program stored in the memory, which can actively control the start-stop of the engine according to the priority of the start-stop type, which can well respond to the driving intention of the driver, the driving experience is improved, the start-stop time of the engine is saved, and the fuel consumption of the vehicle is greatly reduced, and the driving safety of the vehicle and the personal safety of the driver and passengers are guaranteed.

In order to achieve above objects, in a fourth aspect of the present application provides a computer-readable storage medium, where the computer-readable storage medium stores a computer program, and when the program is executed by a processor, the method for start-stop controlling of a vehicle according to the embodiment of the first aspect of the present application is implemented.

In the computer-readable storage medium according to embodiments of the present application, by the processor executing a computer program stored in the memory, which can actively control the start-stop of the engine according to the priority of the start-stop type, which can well respond to the driving intention of the driver, the driving experience is improved, the start-stop time of the engine is saved, and the fuel consumption of the vehicle is greatly reduced, and the driving safety of the vehicle and the personal safety of the driver and passengers are guaranteed.

Additional aspects and advantages of the present application will be set forth, in part, from the following description, and in part will be apparent from the following description, or may be learned by practice of the present application.

BRIEF DESCRIPTION OF THE DRAWINGS

The above and/or additional aspects and advantages of the present application will become apparent and readily understood from the following description of embodiments taken in conjunction with the accompanying drawings, wherein.

DETAILED DESCRIPTION

Figure 1:
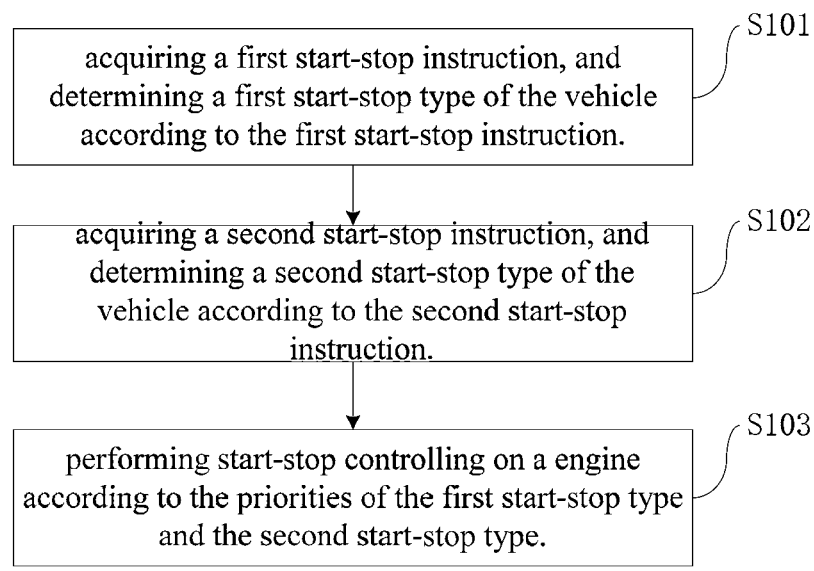
FIG. 1 is a flowchart of a method for controlling start-stop of a vehicle according to an embodiment of the present application.

The following describes in detail the embodiments of the present application, examples of which are illustrated in the accompanying drawings, wherein the same or similar reference numerals refer to the same or similar elements or elements having the same or similar functions throughout. The embodiments described below with reference to the accompanying drawings are exemplary, and are intended to explain the present application and should not be construed as limiting the present application.

The following describes a method for controlling start-stop of a vehicle, a device for controlling start-stop of a vehicle, a vehicle, an electronic apparatus, and a computer-readable storage medium according to embodiments of the present application with reference to the accompanying drawings.

FIG. 1 is a flowchart of a method for controlling start-stop of a vehicle according to an embodiment of the present application. In the embodiment of the present application, the vehicle may be a pure fuel vehicle or a hybrid electric vehicle (HEV).

As shown in FIG. 1, the method for controlling start-stop of a vehicle according to an embodiment of the present application includes the following steps:

S101: acquiring a first start-stop instruction, and determining a first start-stop type of the vehicle according to the first start-stop instruction.

S102: acquiring a second start-stop instruction, and determining a second start-stop type of the vehicle according to the second start-stop instruction.

Among them, the start-stop instructions can be divided into two categories: engine start instructions and engine stop instructions, and start-stop types can also be divided into two categories: start types and stop types.

It should be noted that the above start-stop instructions, start-stop types, start-stop instructions and start-stop types can be calibrated according to actual conditions, and can be preset in the control system of the vehicle, for example, can be stored in the vehicle controller of the vehicle.

Optionally, the start-stop instruction can carry type indication information of the start-stop type, and after acquiring the first or second start-stop instruction, the type indication information can be extracted from the first or second start-stop instruction, and then identifying the type indication information of the start-stop type of the first or second start-stop instruction.

In an embodiment of the present application, before acquiring the start-stop instruction, the method may further include monitoring the real-time working condition of the vehicle, and generating the start-stop instruction according to the real-time working condition. The start-stop types of the start-stop instructions generated under different working conditions are often different.

Among them, when the vehicle is an automatic transmission model, the real-time working conditions include gear position information, the opening degree of the accelerator pedal, the opening degree of the brake pedal, the vehicle speed, the position information of the buttons and/or switches on the instrument panel and/or the console, and information such as whether the parts are abnormal and whether the body has collided; when the vehicle is a hybrid vehicle, the real-time working conditions also include information such as the state of charge (hereinafter referred to as "SOC") of the battery.

Further, the real-time working conditions of the vehicle can be monitored by installing detection devices such as sensors at the relevant positions of the vehicle. For example, a switch position sensor can be installed at the gear switch to monitor the gear information, a pedal position sensor can be respectively installed at the accelerator pedal and brake pedal to monitor the opening of the accelerator pedal and brake pedal, and a speed sensor can be installed at the wheel to monitor the vehicle speed, and a position sensor can be installed at the buttons and/or switches on the instrument panel and/or console to monitor position information of the instrument panel and/or console, and position sensors can be installed on the left and right chassis of the vehicle to monitor whether the body collides.

For example, if the vehicle is a pure fuel vehicle and the engine of the vehicle is not in the started state, that is, the engine is in one of the states of stop state, starting process, and stopping process, if it is detected that the vehicle is in neutral or forward gear, and the accelerator pedal is depressed at the same time, which indicates that the driver has the intention to start the vehicle at this time, a start instruction can be generated, and determining that the start-stop type is a comfortable start.

For example, if the vehicle is a hybrid vehicle, and the engine of the vehicle is not in the stopped state, that is, the engine is in one of the states of started state, starting process, and stopping process, if it is detected that the battery SOC is greater than the set value, it means that the battery charge has met the driving needs. In order to reduce fuel consumption, the engine can be controlled to stop, and a stop instruction can be generated at this time, and the stop type is determined as a normal stop.

S103: performing start-stop controlling on a engine according to the priorities of the first start-stop type and the second start-stop type. Among them, the priority of start-stop type can be calibrated according to factors such as fuel consumption, driving safety of the vehicle, personal safety of drivers and passengers, etc., and can be preset in the control system of the vehicle, for example, can be stored in the vehicle controller.

Therefore, the controlling method can flexibly set the priority of the start-stop type according to the actual situation, which has strong adaptability, and can actively control the start-stop of the engine according to the priority of the start-stop type.

In an embodiment of the present application, different priorities may be divided for start-stop types in advance according to the actual application of the vehicle and vehicle safety. After acquiring the second start-stop type, the priority of the first start-stop type and the priority of the second start-stop type can be queried, and then comparing the priorities of the two to select the start-stop type with the higher priority, and then executing the start-stop instruction corresponding to the start-stop type with the higher priority. That is to say, the start-stop type with the higher priority among the first start-stop type and the second start-stop type is acquired as the target start-stop type, and the start-stop controlling is performed on the engine according to the target start-stop type.

For example, after determining that the first start-stop type is a comfortable start, if a vehicle collision or a serious abnormality of parts is detected, a stop instruction can be generated, which can be used as the second start-stop instruction, and the second start-stop type is determined to be emergency stop, for the driving safety of the vehicle and the personal safety of the driver and passengers, the engine stop must be controlled at this time, that is, the priority of emergency stop is higher than that of comfortable start, so emergency stop is acquired as the target start-stop type, and further according to the emergency stop way to control the engine to stop. Therefore, the controlling method can actively control the start-stop of the engine according to the priority of the start-stop type, which ensures the driving safety of the vehicle and the personal safety of the driver and passengers. Further, after receiving the start-up instruction, it can respond the stop instruction quickly, the start-stop time of the engine is saved and the fuel consumption of the vehicle is greatly reduced.

In one embodiment of the present application, the step of performing start-stop controlling on the engine according to the target start-stop type may include acquiring a start-stop process matching the target start-stop type, and performing start-stop controlling on the engine according to the start-stop process, and the start-stop process includes the start-stop torque control gradient and target speed that are required in the start-stop process, and the target start-stop type selected by the vehicle to execute is the first start-stop type or the second start-stop type.

It should be noted that the start-stop process matching the start-stop type can be calibrated according to the actual situation, and can be preset in the control system of the vehicle, for example, can be stored in the vehicle controller.

Therefore, the controlling method can flexibly set a start-stop process matching the start-stop type according to the start-stop type set by the vehicle, and has strong adaptability.

In one embodiment of the present application, if the start-stop type selected to be executed by the vehicle is the start type, since the engine speed increases during the starting process of the engine, the start-stop torque control gradient is the torque rise gradient at this time; if the start-stop type selected to be executed by the vehicle is the stop type, since the engine speed decreases during the stop process, the start-stop torque control gradient is the torque decrease gradient at this time.

As another embodiment of the present application, if the priority of the first start-stop type is the same as the priority of the second start-stop type, then acquiring a triggering moment of the first start-stop instruction corresponding to the first start-stop type and a triggering moment of the second start-stop instruction corresponding to the second start-stop type, and selecting the start-stop type with earlier triggering moment as the target start-stop type.

In summary, according to the method for controlling start-stop of a vehicle according to the embodiment of the present application, firstly, acquiring a first start-stop instruction, and determining a first start-stop type of the vehicle according to the first start-stop instruction; acquiring a second start-stop instruction, and determining a second start-stop type of the vehicle according to the second start-stop instruction; and finally, performing start-stop controlling on an engine according to priorities of the first start-stop type and the second start-stop type. Therefore, the controlling method can actively control the start-stop of the engine according to the priority of the start-stop type, which can well respond to the driving intention of the driver, the driving experience is improved, the start-stop time of the engine is saved, and the fuel consumption of the vehicle is greatly reduced, and the driving safety of the vehicle and the personal safety of the driver and passengers are guaranteed.

Figure 2:
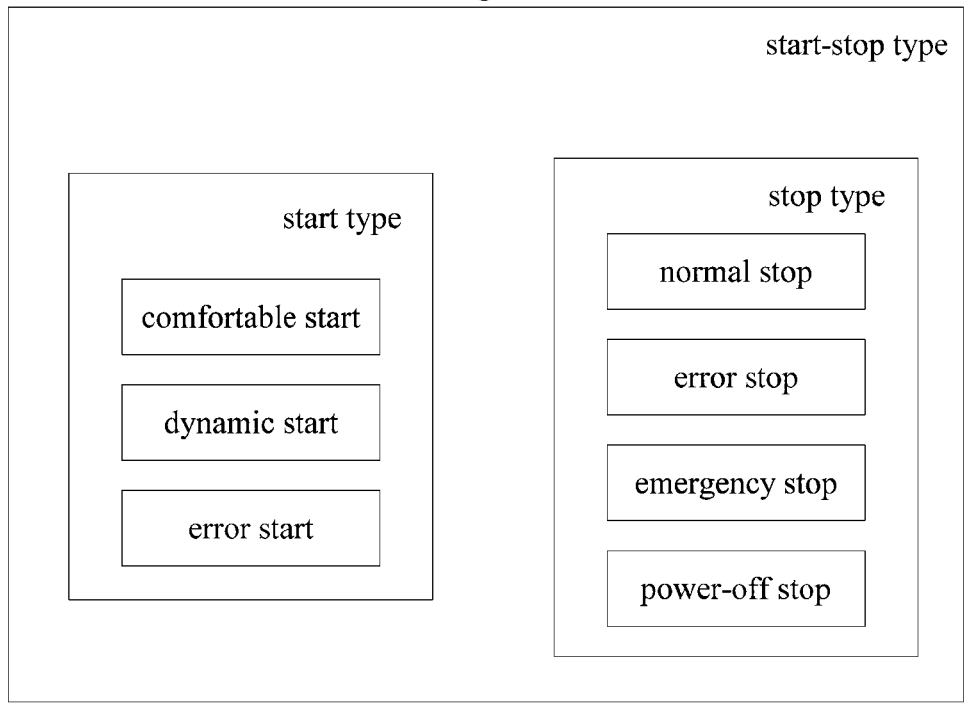
FIG. 2 is a flowchart of a method for controlling start-stop of a vehicle according to another embodiment of the present application.

Vehicles have different working conditions, and different working conditions may generate different start-stop instructions, corresponding to different start-stop types. As shown in FIG. 2, the start-stop types can be divided into start types and stop types. Among them, the start types may include types such as a comfortable start, a dynamic start, and an error start. The stop types can include a normal stop, an error stop, emergency stop, power-off stop, etc.

The following will introduce the start types and stop types of the vehicle respectively.

Before the start-stop instruction is generated, the engine of the vehicle is not in the started state, that is, the engine is in one of the states of the stop state, the starting process, and the stopping process.

The start of the vehicle under normal working conditions is a comfortable start, which can include the following situations:

(1) The vehicle is a pure fuel vehicle, the vehicle is in neutral or forward gear, and the accelerator pedal is depressed at the same time.
(2) The vehicle is a hybrid vehicle, the battery SOC is less than the set value, and the vehicle speed is not less than the set value. The set value can be calibrated according to the actual situation, and can be preset in the control system of the vehicle, for example, can be set in the vehicle controller.

In the first situation, the driver has the intention to start the vehicle, so it is necessary to start the engine. Therefore, this method can respond well to the driver's driving intention and improve the driving experience. In the second situation, since the battery charge is too low to meet the driving needs at this time, so it is necessary to start the engine to charge the battery. Therefore, this method can ensure that the battery charge of the hybrid vehicle is not lower than the set value to meet the driving needs.

The start when the vehicle needs power to respond quickly is dynamic start. For example, when the vehicle is a hybrid vehicle and an automatic transmission model, if it is detected that the accelerator pedal is fully depressed and the kickdown is triggered, the torque demand of the vehicle at this time is large, so the engine can be started to meet the torque demands of the vehicle. Therefore, the method can actively start the engine to meet the power demand of the vehicle when the vehicle needs a rapid response of power, which can respond well to the driving intention of the driver, and improve the driving experience.

When the vehicle is a hybrid vehicle, it is detected that the electric power system of the vehicle has a serious failure, and the start when the driving needs cannot be met is called an error start. For example, when it is detected that the drive motor of a hybrid vehicle fails and cannot meet the driving needs, the engine can be started at this time. Therefore, the method can actively start the engine to meet the driving needs of the vehicle when the electric power system of the hybrid electric vehicle fails and cannot meet the driving needs, thereby improving the driving experience of the driver.

Similarly, before the stop instruction is generated, the engine of the vehicle is not in a stop state, that is, the engine is in one of the states of the start state, the starting process, and the stopping process.

The stop of the vehicle under normal working conditions is a normal stop, which can include the following situations:
(1) The vehicle is in neutral, and the vehicle speed is not greater than the set value.
(2) The vehicle is a hybrid vehicle, and the battery SOC is greater than the set value.

It should be noted that the set value may be calibrated according to the actual situation, and may be preset in the control system of the vehicle, for example, may be set in the vehicle controller.

In the first situation, the driver has the intention to stop the vehicle, so it is necessary to control the engine to stop. Therefore, the method can respond well to the driver's driving intention and improve the driving experience. In the second situation, since the battery charge has been met the driving needs, in order to reduce the fuel consumption, the engine can be controlled to stop. Therefore, the method can reduce the fuel consumption of the hybrid vehicle, which is beneficial to environmental protection.

The stop when the parts of the vehicle have a slight abnormality is an error stop. For example, if the braking effect of the brake pedal is poor, the front and rear suspension joints are deformed, the instrument panel does not display, or the ABS system fails, the engine can be controlled to stop for the safety of the vehicle and the personal safety of the drivers and passengers.

The stop of the vehicle when the parts of the vehicle are in a serious abnormal situation or the vehicle is in an emergency situation is an emergency stop. Among them, serious abnormalities in the parts of the vehicle may include disorders of the lighting system of the vehicle, brake pedal failure, steering wheel failure, excessive engine wear, etc., and emergency situations may include vehicle collision, tire blowout, fire, etc. In these cases, For the driving safety of the vehicle and the personal safety of the drivers and passengers, the engine stop must be controlled.

The stop of the vehicle when the whole vehicle is powered off is the power-off stop. Since the instrument panel, console, lighting system and other devices of the vehicle cannot be used at this time, it is necessary to control the engine stop for the driving safety of the vehicle and the personal safety of the driver and passengers.

Continuing to take the embodiment shown in FIG. 2 as an example, the priority of the start-stop type can be calibrated according to factors such as fuel consumption, vehicle driving safety, and personal safety of drivers and passengers. The priority can be set as: (1) the emergency stop has the highest priority; (2) the priorities of the error stop and the power-off stop are higher than that of all start types; (3) the priority of the error start is higher than that of the comfortable start, the dynamic start, and the normal stop; (4) the priority of the dynamic start is higher than that of the comfortable start; (5) the priorities of the dynamic start and the comfortable startup are higher than that of the normal stop.

Continuing to take the embodiment shown in FIG. 2 as an example, when the start-stop type is the error stop, the emergency stop, or the power-off stop, the target speed of the engine should be set to 0. Because in these cases, for the driving safety of the vehicle and the personal safety of the driver and passengers, the engine should be controlled to stop, and the stopping process will not be terminated due to the start instruction.

Among them, when the start-stop type is a normal stop, in order to quickly respond to the start instruction, the first target speed of the engine can be preset to a lower speed value, and the maintenance time of the first target speed can be preset. The first target speed and the maintenance time can be calibrated according to the actual situation, for example, the first target speed can be set to 300 rpm, and the maintenance time can be set to 3 seconds, if the start instruction is not acquired when the engine speed is reduced to 300 rpm and the engine speed is maintained at 300 rpm within 3 seconds, the second target speed can be preset to 0, that is, the engine speed can continue to be reduced until the engine stops, during which time the start instruction can still be responded.

Figure 3:
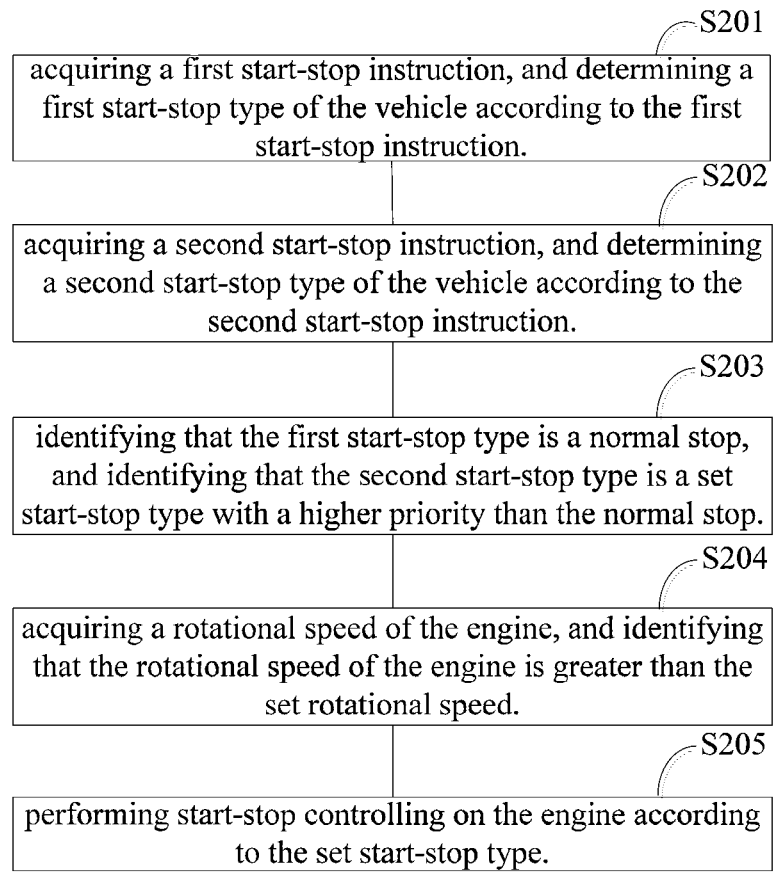
FIG. 3 is a schematic diagram of a start-stop type of a vehicle according to a specific embodiment of the present application.

FIG. 3 is a flowchart of the method for controlling start-stop of a vehicle according to another embodiment of the present application.

As shown in FIG. 3, the method for controlling start-stop of a vehicle according to an embodiment of the present application includes the following steps:

S201: acquiring a first start-stop instruction, and determining a first start-stop type of the vehicle according to the first start-stop instruction.

S202: acquiring a second start-stop instruction, and determining a second start-stop type of the vehicle according to the second start-stop instruction.

S203: identifying that the first start-stop type is a normal stop, and identifying that the second start-stop type is a set start-stop type with a higher priority than the normal stop.

S204: acquiring a rotational speed of the engine, and identifying that the rotational speed of the engine is greater than the set rotational speed.

Among them, the rotational speed of the engine can be detected by installing a speed sensor on the crankshaft of the engine, and the set speed can be the minimum speed limit that the starter motor of the engine can continue to run, which can be calibrated according to the actual situation and preset in the control system of the vehicle, for example, it can be stored in the vehicle controller.

S205: performing start-stop controlling on the engine according to the set start-stop type.

Continuing to take the embodiment shown in FIG. 2 as an example, the set start-stop type may include comfortable start and dynamic start. When the determined first start-stop type is normal stop and the determined second start-stop type is comfortable start, it can be identified that comfortable start is the set start-stop type with a higher priority than the normal stop, and then the engine speed is acquired through the speed sensor, and recall the pre-stored set speed from the vehicle controller, and then identifying that the engine speed is greater than the set speed, indicating that the engine meets the starting conditions at this time, and the comfortable start can be used as the target start-stop type, and controlling the engine to start according to the way of comfortable start.

Therefore, when the controlling method identifies that the normal stop is the first start-stop type, and identifies that the comfortable start or the dynamic start is the second start-stop type, the method can determine that the engine speed is greater than the set speed and meet the start condition, then controlling the start process of starting the engine, avoid the situation that the engine cannot be started because the engine speed is lower than the set speed, and can better respond to the start-stop instruction.

It should be noted that, for details not disclosed in the method for controlling start-stop of a vehicle in the embodiment of the present application, and refer to the details disclosed in the the method for controlling start-stop of a vehicle of the above-mentioned embodiments of the present application, which will not be repeated herein.

In summary, according to the method for controlling start-stop of a vehicle according to the embodiment of the present application, when the normal stop is identified as the first start-stop type, and the comfortable start or dynamic start is identified as the second start-stop type, it can be determined that the speed meets the starting conditions by identifying that the engine speed is greater than the set start-stop type, then the start process of the engine is controlled, which avoids the situation that the engine cannot be started because the speed of the engine is lower than the set speed, and can better respond to the start-stop instruction.

Figure 4:
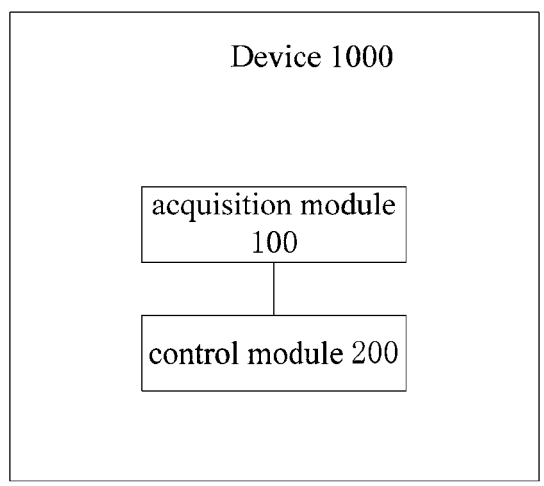
FIG. 4 is a block schematic diagram of a device for controlling start-stop of a vehicle according to an embodiment of the present application.

FIG. 4 is a schematic block diagram of a device for controlling start-stop of a vehicle according to an embodiment of the present application.

As shown in FIG. 4, the device 1000 for controlling start-stop of a vehicle according to an embodiment of the present application includes an acquisition module 100 and a control module 200, the acquisition module 100 is optionally a preferably an acquisition processor disposed in the vehicle console; and the control module 200 is preferably a control circuit of a start-stop controller of the engine in the vehicle.

The acquisition processor 100 is configured for acquiring a first start-stop instruction and a second start-stop instruction.

The control circuit 200 is configured for determining a first start-stop type of the vehicle according to the first start-stop instruction, determining a second start-stop type of the vehicle according to the second start-stop instruction, and performing start-stop controlling on an engine according to priorities of the first start-stop type and the second start-stop type.

In an embodiment of the present application, the control module 200 is further configured for acquiring a start-stop type with a higher priority among the first start-stop type and the second start-stop type as a target start-stop type, and performing start-stop controlling on the engine according to the target start-stop type.

In an embodiment of the present application, the control module 200 is further configured for acquiring a start-stop process matching the target start-stop type selected and executed by the vehicle; wherein the start-stop process comprises a start-stop torque control gradient and a target rotational speed that are required in the start-stop process; and the target start-stop type is the first start-stop type or the second start-stop type; and performing start-stop controlling on the engine according to the start-stop process.

In an embodiment of the present application, the control module 200 is further configured for when the target start-stop type selected to be executed by the vehicle is a start type, the start-stop torque control gradient is a torque rise gradient; and when the target start-stop type selected to be executed by the vehicle is a stop type, the start-stop torque control gradient is a torque decrease gradient.

In an embodiment of the present application, the control module 200 is further configured for acquiring a rotational speed of the engine and when identifying that the rotation speed is greater than a set speed then performing start-stop controlling on the engine according to a set start-stop type when the first start-stop type is a normal stop, and the second start-stop type is the set start-stop type with a higher priority than the normal stop; wherein the set start-stop type is the target start-stop type.

In an embodiment of the present application, the control module 200 is further configured for when identifying that the priority of the first start-stop type is the same as the priority of the second start-stop type, then acquiring a triggering moment of the first start-stop instruction corresponding to the first start-stop type and a triggering moment of the second start-stop instruction corresponding to the second start-stop type, and selecting the start-stop type with earlier triggering moment as the target start-stop type.

In an embodiment of the present application, the acquisition module 100 is further configured for monitoring real-time working condition of the vehicle, and generating start-stop instructions according to the real-time working condition.

It should be noted that, for details not disclosed in the device for controlling start-stop of a vehicle of the embodiment of the present application, refer to the details disclosed in the method for controlling start-stop of a vehicle of the embodiments of the present application, which will not be repeated herein.

In summary, the the device for controlling start-stop of a vehicle according to an embodiment of the present application, the first start-stop instruction and the second start-stop instruction are firstly acquired, and then determining the first start-stop type and the second start-stop type of the vehicle respectively according to the first start-stop instruction and the second start-stop instruction, and finally, performing start-stop controlling on an engine according to priorities of the first start-stop type and the second start-stop type. Therefore, the controlling device can actively control the start-stop of the engine according to the priority of the start-stop type, which can well respond to the driving intention of the driver, the driving experience is improved, the start-stop time of the engine is saved, and the fuel consumption of the vehicle is greatly reduced, and the driving safety of the vehicle and the personal safety of the driver and passengers are guaranteed.

Figure 5:
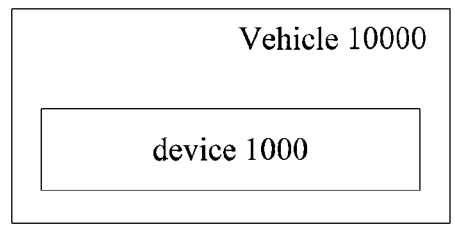
FIG. 5 is a schematic block diagram of a vehicle according to one embodiment of the present application.

In order to realize the above embodiments, the present application also provides a vehicle 10000, as shown in FIG. 5, including the device 1000 for controlling tart-stop of a vehicle described in the above embodiments.

The vehicle according to embodiments of the present application, by the device for controlling tart-stop of a vehicle, which can actively control the start-stop of the engine according to the priority of the start-stop type, which can well respond to the driving intention of the driver, the driving experience is improved, the start-stop time of the engine is saved, and the fuel consumption of the vehicle is greatly reduced, and the driving safety of the vehicle and the personal safety of the driver and passengers are guaranteed.

Figure 6:
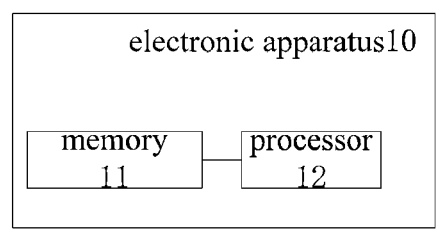
FIG. 6 is a schematic block diagram of an electronic apparatus according to an embodiment of the present application.

In order to realize the above embodiments, the present application also provides an electronic apparatus 10, as shown in FIG. 6, including a memory 11 and a processor 12; the processor 12 executes a program corresponding to the executable program code by reading the executable program code stored in the memory 11, to implement the method for start-stop controlling of a vehicle described in the above embodiments.

The electronic apparatus according to embodiments of the present application, by the processor executing a computer program stored in the memory, which can actively control the start-stop of the engine according to the priority of the start-stop type, which can well respond to the driving intention of the driver, the driving experience is improved, the start-stop time of the engine is saved, and the fuel consumption of the vehicle is greatly reduced, and the driving safety of the vehicle and the personal safety of the driver and passengers are guaranteed.

In order to implement the above embodiments, the present application also provides provides a computer-readable storage medium, where the computer-readable storage medium stores a computer program, and when the program is executed by a processor, the method for start-stop controlling of a vehicle described in the above embodiments of the present application is implemented The electronic apparatus according to embodiments of the present application, by the processor executing a computer program stored in the memory, which can actively control the start-stop of the engine according to the priority of the start-stop type, which can well respond to the driving intention of the driver, the driving experience is improved, the start-stop time of the engine is saved, and the fuel consumption of the vehicle is greatly reduced, and the driving safety of the vehicle and the personal safety of the driver and passengers are guaranteed.

In the description of the present application, it should be understood that the terms "center", "longitudinal", "lateral", "length", "width", "thickness", "upper", "lower", "front", "rear", "left", "right", "vertical", "horizontal", "top", "bottom", "inner", "outer", "clockwise", "counterclockwise", "axial, "radial", "circumferential" and other indicated orientations or positional relationships are based on the orientations or positional relationships shown in the accompanying drawings, and are only for the convenience of describing the present application and simplifying the description, rather than indicating or implying the indicated device or elements must have a particular orientation, be constructed and operate in a particular orientation and are therefore not to be construed as limitations of the present application.

In addition, the terms "first" and "second" are only used for descriptive purposes, and should not be construed as indicating or implying relative importance or implying the number of indicated technical features. Thus, a feature defined as "first" or "second" may expressly or implicitly include one or more of that feature. In the description of the present application, "plurality" means two or more, unless otherwise expressly and specifically defined.

In the present application, unless otherwise expressly specified and limited, the terms "installed", "connected", "connecting", "fixed" and other terms should be understood in a broad sense, for example, it may be a fixed connection or a detachable connection, or integrated; it can be a mechanical connection or an electrical connection; it can be a direct connection or an indirect connection through an intermediate medium, and it can be the internal connection of the two elements or the interaction relationship between the two elements. For those skilled in the art, the specific meanings of the above terms in the present application can be understood according to specific situations.

In the present application, unless otherwise expressly specified and limited, a first feature "on" or "under" a second feature may be in direct contact between the first and second features, or the first and second features indirectly through an intermediary contact. Also, the first feature being "above", "over" and "on" the second feature may mean that the first feature is directly above or obliquely above the second feature, or simply means that the first feature is level higher than the second feature. The first feature being "below", and "under" the second feature may mean that the first feature is directly below or obliquely below the second feature, or simply means that the first feature has a lower level than the second feature.

In the description of this specification, description with reference to the terms "one embodiment," "some embodiments," "example," "specific example," or "some examples", etc., mean specific features described in connection with the embodiment or example, structure, material or feature is included in at least one embodiment or example of the present application. In this specification, schematic representations of the above terms are not necessarily directed to the same embodiment or example. Furthermore, the particular features, structures, materials or characteristics described may be combined in any suitable manner in any one or more embodiments or examples. Furthermore, those skilled in the art may combine and combine the different embodiments or examples described in this specification, as well as the features of the different embodiments or examples, without conflicting each other.

Although the embodiments of the present application have been shown and described above, it should be understood that the above-mentioned embodiments are exemplary and should not be construed as limiting the present application. Embodiments are subject to variations, modifications, substitutions and variations.

What is claimed is:

1. A method for controlling start-stop of a vehicle, applied to the vehicle, comprising steps as following:
   acquiring, through a processer, a first start-stop instruction, and determining, through a vehicle controller, a first start-stop type of the vehicle according to the first start-stop instruction;
   acquiring, through a processer, a second start-stop instruction, and determining, through a vehicle controller, a second start-stop type of the vehicle according to the second start-stop instruction; and
   performing, through a control circuit, start-stop controlling on an engine according to priorities of the first start-stop type and the second start-stop type.

2. The method according to claim 1, wherein the step of performing start-stop controlling on an engine according to priorities of the first start-stop type and the second start-stop type comprises:
   acquiring a start-stop type with a higher priority among the first start-stop type and the second start-stop type as a target start-stop type, and performing start-stop controlling on the engine according to the target start-stop type.

3. The method according to claim 2, wherein the method further comprises:
   acquiring a start-stop process matching the target start-stop type selected and executed by the vehicle; wherein the start-stop process comprises a start-stop torque control gradient and a target rotational speed that are required in the start-stop process; and the target start-stop type is the first start-stop type or the second start-stop type; and
   performing start-stop controlling on the engine according to the start-stop process.

4. The method according to claim 3, wherein the method further comprises:
when the target start-stop type selected to be executed by the vehicle is a start type, the start-stop torque control gradient is a torque rise gradient; and
when the target start-stop type selected to be executed by the vehicle is a stop type, the start-stop torque control gradient is a torque decrease gradient.

5. The method according to claim 2, the step of performing start-stop controlling on the engine according to the target start-stop type further comprises:
acquiring a rotational speed of the engine and when identifying that the rotation speed is greater than a set speed then performing start-stop controlling on the engine according to a set start-stop type when the first start-stop type is a normal stop, and the second start-stop type is the set start-stop type with a higher priority than the normal stop; wherein the set start-stop type is the target start-stop type.

6. The method according to claim 1, wherein the method further comprises:
when identifying that the priority of the first start-stop type is the same as the priority of the second start-stop type, then acquiring a triggering moment of the first start-stop instruction corresponding to the first start-stop type and a triggering moment of the second start-stop instruction corresponding to the second start-stop type, and selecting the start-stop type with earlier triggering moment as the target start-stop type.

7. The method according to claim 1, wherein the method further comprises:
monitoring real-time working condition of the vehicle, and generating start-stop instructions according to the real-time working condition.

8. A vehicle, comprising a device for controlling start-stop of the vehicle, wherein the device comprises an acquisition processer disposed in a vehicle console and a control circuit of a start-stop controller of an engine in the vehicle:
the acquisition processor, configured for acquiring a first start-stop instruction and a second start-stop instruction; and
the control circuit, configured for determining a first start-stop type of the vehicle according to the first start-stop instruction, determining a second start-stop type of the vehicle according to the second start-stop instruction, and performing start-stop controlling on an engine according to priorities of the first start-stop type and the second start-stop type.

9. The vehicle according to claim 8, wherein the control module is configured for:
acquiring a start-stop type with a higher priority among the first start-stop type and the second start-stop type as a target start-stop type, and performing start-stop controlling on the engine according to the target start-stop type.

10. The vehicle according to claim 9, wherein the control module is further configured for:
acquiring a start-stop process matching the target start-stop type selected and executed by the vehicle; wherein the start-stop process comprises a start-stop torque control gradient and a target rotational speed that are required in the start-stop process; and the target start-stop type is the first start-stop type or the second start-stop type; and
performing start-stop controlling on the engine according to the start-stop process.

11. The vehicle according to claim 10, wherein when the target start-stop type selected to be executed by the vehicle is a start type, the start-stop torque control gradient is a torque rise gradient; and
when the target start-stop type selected to be executed by the vehicle is a stop type, the start-stop torque control gradient is a torque decrease gradient.

12. The vehicle according to claim 9, wherein the control module is configured for:
acquiring a rotational speed of the engine and when identifying that the rotation speed is greater than a set speed then performing start-stop controlling on the engine according to a set start-stop type when the first start-stop type is a normal stop, and the second start-stop type is the set start-stop type with a higher priority than the normal stop; wherein the set start-stop type is the target start-stop type.

13. The vehicle according to claim 8, wherein the control module is configured for:
when identifying that the priority of the first start-stop type is the same as the priority of the second start-stop type, then acquiring a triggering moment of the first start-stop instruction corresponding to the first start-stop type and a triggering moment of the second start-stop instruction corresponding to the second start-stop type, and selecting the start-stop type with earlier triggering moment as the target start-stop type.

14. The vehicle according to claim 8, wherein the acquisition module is further configured for:
monitoring real-time working condition of the vehicle, and generating start-stop instructions according to the real-time working condition.

15. An electronic apparatus, comprising a memory and a processor; wherein the processor executes a program corresponding to the executable program code by reading the executable program code stored in the memory, to implement a method for controlling start-stop of a vehicle, wherein method is configured for executing:
acquiring, through a processer, a first start-stop instruction, and determining, through a vehicle controller, a first start-stop type of the vehicle according to the first start-stop instruction;
acquiring, through a processer, a second start-stop instruction, and determining, through a vehicle controller, a second start-stop type of the vehicle according to the second start-stop instruction; and
performing, through a control circuit, start-stop controlling on the engine according to priorities of the first start-stop type and the second start-stop type.

16. The method according to claim 2, wherein the method further comprises:
monitoring real-time working condition of the vehicle, and generating start-stop instructions according to the real-time working condition.

17. The vehicle according to claim 9, wherein the acquisition module is further configured for:
monitoring real-time working condition of the vehicle, and generating start-stop instructions according to the real-time working condition.

* * * * *